Figure 9:
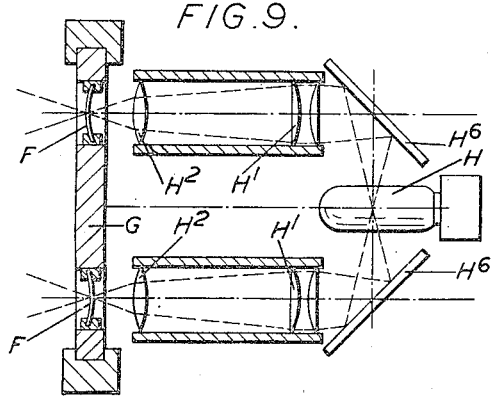

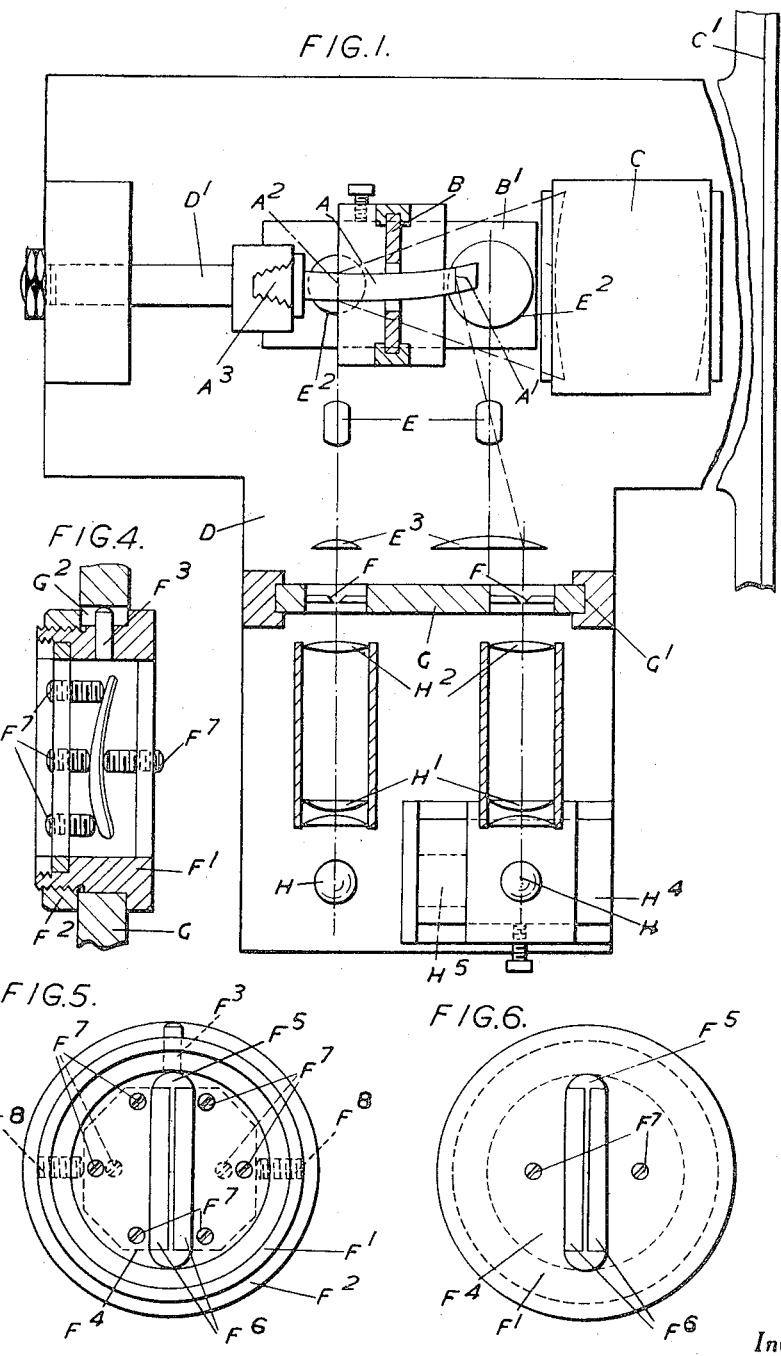

Nov. 29, 1955  R. E. REASON ET AL  2,724,987
OPTICAL MEASURING OR TESTING APPARATUS
Filed Sept. 16, 1952
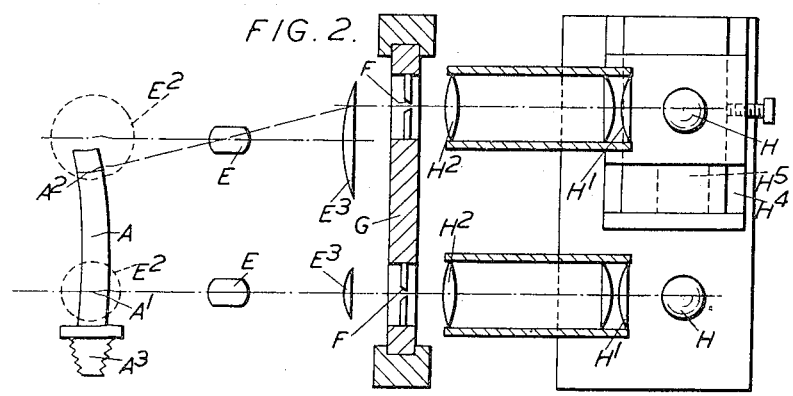
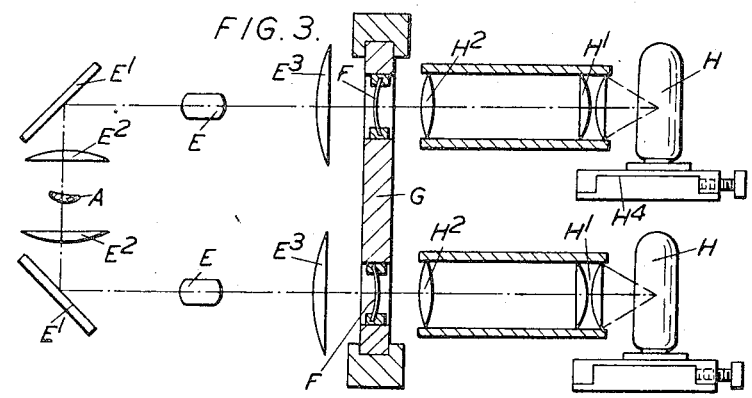
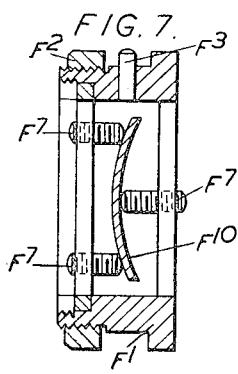
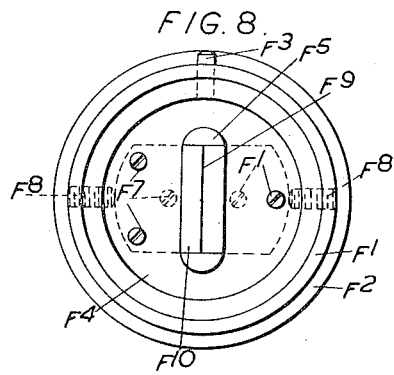
*Inventor*
Richard E. Reason
John R. Adams
Kenneth R. Coleman
By Emery Holcombe & Blair
*Attorney*

*Inventor*
RICHARD E. REASON
JOHN R. ADAMS
KENNETH R. COLEMAN
By Emery, Holcombe & Blair
*Attorney*

Nov. 29, 1955 R. E. REASON ET AL 2,724,987
OPTICAL MEASURING OR TESTING APPARATUS
Filed Sept. 16, 1952 5 Sheets-Sheet 5

Inventor
RICHARD E. REASON
JOHN R. ADAMS
KENNETH R. COLEMAN
By
Emery Holcombe + Blair
Attorney

United States Patent Office 2,724,987
Patented Nov. 29, 1955

2,724,987

OPTICAL MEASURING OR TESTING APPARATUS

Richard Edmund Reason, John Reginald Adams, and Kenneth Roy Coleman, Leicester, England, assignors to Kapella Limited, Leicester, England, a British company Application September 16, 1952, Serial No. 309,822

Claims priority, application Great Britain September 18, 1951

6 Claims. (Cl. 88—24)

This invention relates to optical apparatus for measuring or testing the accuracy of plane section profiles. In one known arrangement of such apparatus, an illuminating device is employed to produce on the surface of a body to be examined a line which defines the plane section profile thereon, and an optical projection system is provided to form an image of such section profile in an image plane, for example on a projection screen, where it can be accurately measured or compared with a standard profile. The illuminating device in such arrangement is preferably arranged to focus on the surface of the body an image of a mask, such as a slit or knife edge, shaped to suit the section profile, and the present invention is primarily concerned with apparatus including an illuminating device of this kind.

This invention, although not limited thereto, is especially intended for the examination of bodies, such as turbine blades, for which it is desirable to measure or test not only the shapes and sizes of individual plane section profiles but also the positions of such profiles relatively to one another.

The apparatus according to the invention comprises a base, means for mounting on the base a body whose section profiles are to be examined, means for simultaneously defining two or more parallel plane section profiles on the surface of the body, and optical means for projecting images of such section profiles, the said defining means comprising means for detachably mounting on the base a framework carrying masks associated with and shaped to suit the individual section profiles of the particular body under examination, means on the base for illuminating such masks, and optical means on the base for focussing images of the masks on the surface of the body. Preferably, two masks are provided on the framework for each section profile, such masks being imaged on the surface of the body on opposite sides thereof, whereby the section profile will extend substantially round the complete perimeter of the body. Alternatively, two frameworks may be detachably mounted on the base, each carrying masks associated with the individual section profiles, the masks on one framework being associated with the portions of the section profiles on one side of the body, whilst those on the other framework are associated with the remaining portions of the section profiles on the opposite side of the body.

For illuminating the masks, it will usually be convenient to employ two or more illuminating units, respectively associated with the section profiles, or a separate illuminator unit for each mask. Similarly, although it may sometimes be practicable to employ a single lens system for imaging more than one mask on the surface of the body, it will usually be preferable to employ a separate lens system for each mask.

In practice, the apparatus will usually be such that bodies of different sizes and shapes can be examined, and it will be clear that a separate mask framework will be required for each size and shape of body. Thus, for example, in the case of turbine blades, the section profiles to be examined will be of different shapes and orientations spaced along the length of the blade and may be two or three (or more) in number, and for different sizes of blade different spacings between the section planes will be required. It will usually be necessary, therefore, not only to provide different mask frameworks for the different shapes and sizes of blade, but also to provide for the adjustability of parts of the apparatus to cater for the different spacings of the section planes.

The spacing of the masks may differ on different frameworks in accordance with the desired spacing of the planes of the section profiles. In such case, means may be provided on the base for adjusting the relative positions of the illuminator units or of parts thereof to suit the spacing of the masks on the framework. Although in some instances it may be practicable to employ a lens system large enough to cover the range of possible positions of the associated mask, it will often be more convenient to provide means on the base for adjusting the relative positions of the optical axes of the lens systems to suit the spacing of the masks on the framework.

Alternatively, reflectors may be interposed between the body and the means for imaging the masks thereon, means being provided on the base for adjusting one or more of such reflectors or parts thereof, whereby the spacing of the planes of the section profiles can be altered without movement of the iluminating means or of the means for imaging the masks on the surface of the body, the spacing of the masks being the same on all frameworks and independent of the spacing of the planes of the section profiles. Thus, for instance, the adjustable reflector or each adjustable reflector may consist of or include a right-angled prism so mounted that the rays are reflected twice on the perpendicular faces thereof and emerge parallel to their direction of incidence but in the opposite sense.

The masks may be arranged in various ways, but, in one convenient arrangement, each mask comprises a slit formed between two knife edges each shaped to conform closely to the shape of the associated section profile or part thereof. Each knife edge may be formed by chamfering to the appropriate edge a member shaped to conform closely to the shape of a portion of the body on one side of the plane of the section profile. The two knife edges may be supported by adjusting screws in a cell carried by the framework, whereby they can be so oriented as to be properly imaged on the surface of the body. Alternatively, the mask may consist of a line ruled on a transparent surface curved to the same shape as that of the appropriate portion of the surface of the body, the line preferably being ruled through an opaque coating on the transparent surface to provide a slit of light.

Figure 10:
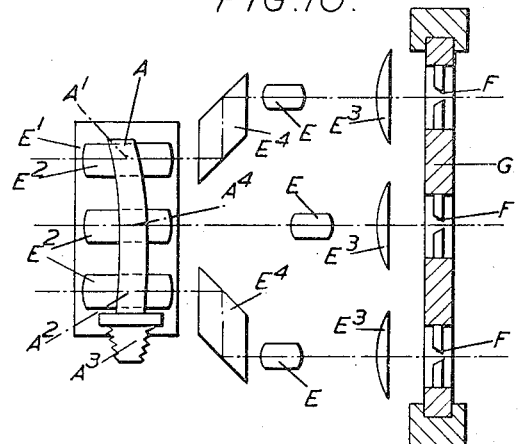
Figure 11:
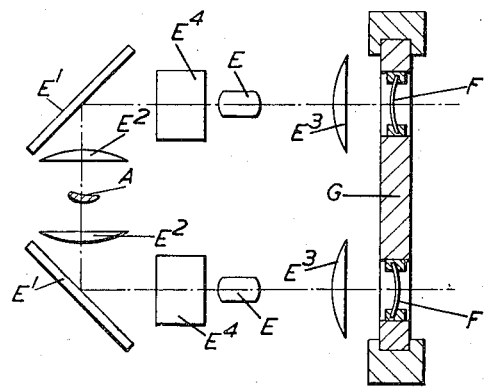
Figure 12:
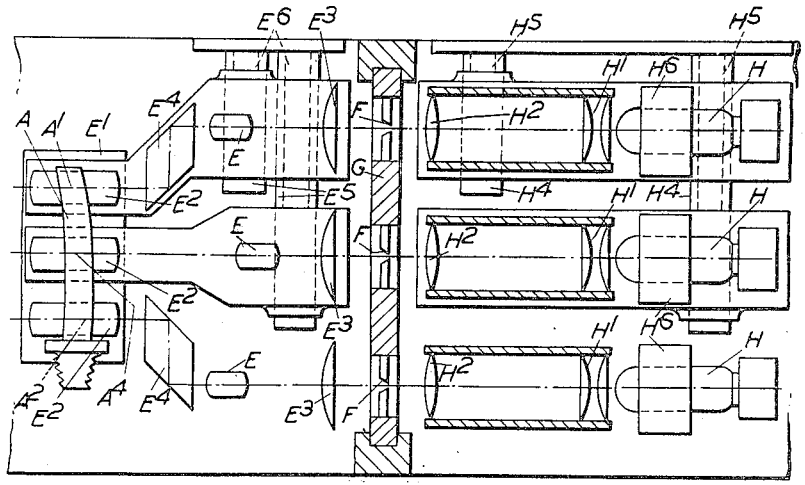
Figure 15:
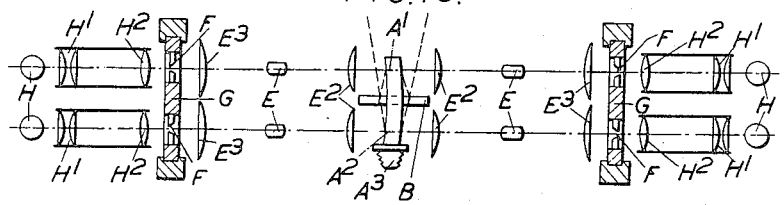
Figure 13:
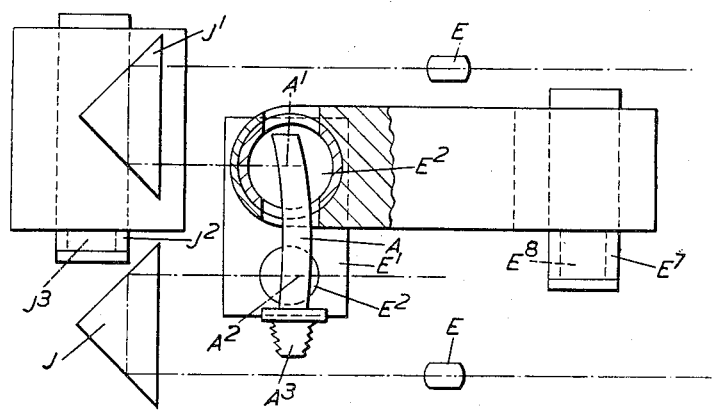
Figure 14:
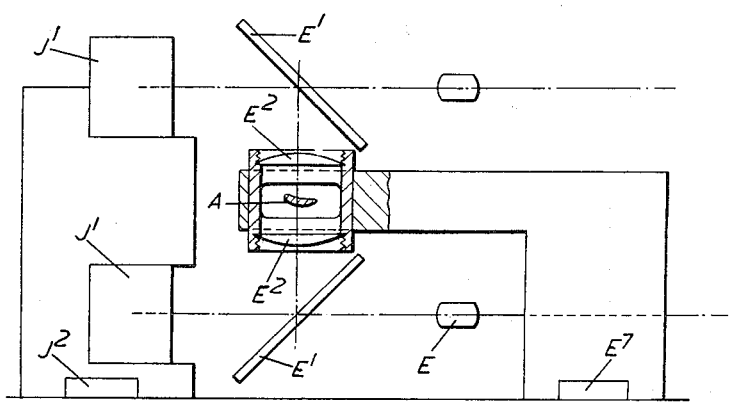

The invention may be carried into practice in various ways, but some convenient alternative practical arrangements according thereto are illustrated diagrammatically by way of example in the accompanying drawings. These arrangements are shown, for convenience, as applied to their use for testing the accuracy of manufacture of turbine blades of aerofoil section, wherein it is necessary to check, not only the shapes of individual sections, but also the relative angular positions of spaced sections of the blade. For this purpose, it will often be sufficient in practice to examine simultaneously the profiles of two sections respectively near the two ends of the blade, whilst for a more thorough test a third section near the middle of the blade may also be examined at the same time. Whilst in some instances it may suffice to examine one face only of the blade, it will usually be important to examine the complete section profiles round the whole perimeter of the blade The arrangements illustrated make this possible, and are also such that they can readily be adjusted to deal with different sizes of blade, for which of course different spacing between the section planes will be required. In the drawings, Figure 1 shows a diagrammatic plan view of the complete apparatus for testing the accuracy of turbine blades, Figures 2 and 3 illustrate respectively in plan and in elevation the means shown in the arrangement of Figure 1 for defining two section profiles on the surface of the blade, Figures 4, 5 and 6 respectively show a vertical section and two views from opposite sides of one of the masks used in the arrangement of Figures 1–3, Figures 7 and 8 are views similar to those of Figures 4 and 5 showing an alternative mask arrangement, Figure 9 illustrates a modification wherein a single illuminating lamp is used for the two parts of a section profile on the two sides of the blade, Figures 10 and 11 are views similar to those of Figures 2 and 3 of an alternative arrangement for defining three section profiles on the blade surface, Figure 12 illustrates means for adjusting parts of the arrangement of Figures 7 and 8 to cater for different sizes of blade, Figures 13 and 14 are views similar to those of Figures 2 and 3 showing a further alternative arrangement for defining two section profiles on the blade surface, and Figure 15 shows yet another alternative arrangement for this purpose.

The various arrangements are primarily concerned with the means for defining the section profiles on the blade surface, and any suitable means may be employed for the simultaneous projection of images of the section profiles on to an image plane, where they can be accurately measured or compared with standard profiles. It is especially advantageous, as shown in Figure 1, to use for this purpose the optical projection system forming the subject of the present applicants' copending United States of America patent application Serial No. 309,606, entitled Optical Projection Systems, filed September 15, 1952, wherein one or more reflectors B are associated with individual section profiles $A^1$ of the blade A and are so located as to bring reflected images thereof all into a single object plane, from which an objective C projects images of all the section profiles on to the image plane $C^1$, the object plane preferably coinciding with the plane of the section profile $A^2$ furthest from the image plane $C^1$ so that the number of reflectors B used is one less than the number of section profiles $A^1$, $A^2$. The reflectors B are preferably partially transparent over their whole field, their transmittance being graded so that the intensity of the beam of light passing through the objective C from any one section profile is substantially the same as that from any other section profile. In a preferred arrangement each partially transparent reflector B has a central opening shaped to conform to the peripheral shape of the appropriate section of the blade A and is formed in two or more parts which can be moved in a mounting towards or away from each other in a direction approximately at right angles to the optical axis of the objective C, one or more of the mountings being adjustable axially to suit different spacings between the section profile planes.

The turbine blades A to be examined are interchangeably mounted by their roots $A^3$ in a chuck or other device $D^1$ on the fixed base D of the apparatus, the arrangement being such that the chosen plane section $A^2$ nearest the root $A^3$ of the blade will always occupy the same plane relatively to the base D, namely the object plane of the projection system C, whatever the size of the blade. The reflector mounting or mountings of the projection system are suitably guided on a slide $B^1$ on the base D, so that they can be readily adjusted to the correct positions in which their associated section profiles will be properly focussed on the image plane $C^1$ of the system. It will usually be desirable to coat the blade surface with a matt white film, such for example as a film of magnesium oxide, to increase the light intensity of the rays used for projecting the profile section images. The fixed base D also carries the means for defining the section profiles on the blade surface, and the various arrangements according to the invention, now to be described, differ from one another in respect of such defining means.

The first arrangement shown more particularly in Figures 2 and 3 provides for defining two section profiles $A^1$, $A^2$ on the blade surface, each section profile being illuminated from above and from below so as to be defined around the complete periphery of the blade A. For this purpose, the arrangement employs four copying lens systems E each acting to image on the surface of the blade A a slit F shaped to conform to the shape of the particular portion of the blade A at which the section profile is to be defined. The four slits F of these optical copying means are carried on a framework G, detachably mounted in a vertical slideway $G^1$ on the base D, and are arranged in two rows, the two slits F in the upper row corresponding to the upper halves of the two section profiles $A^1$, $A^2$, whilst those in the lower row correspond to the lower halves thereof. The optical axes of the four lens systems E lie parallel to one another in accordance with the spacings of the slits F on the framework G, and two plane mirrors $E^1$, each inclined at 45° to the common direction of such optical axes, are provided respectively to deflect the rays from the upper set of lens systems E down on to the upper portion of the blade surface and to deflect the rays from the lower set of lens systems E up to the lower portion of the blade surface.

The copying lens systems or means E may be arranged in various ways but preferably give a 1:1 magnification. One system especially suitable for the purpose is that forming the subject of the copending United States of America Patent Application Serial No. 289,965, comprising two compound meniscus divergent components having their air-exposed surfaces concave to a diaphragm between them and located between two simple convergent components, and two convergent field lenses $E^2$, $E^3$ which embrace such components between them and are so arranged as to render the system telecentric. In practice, the dimensions of such system can be so chosen that the front field lens $E^2$ can be located between the blade A and the inclined mirror $E^1$, the air space between such field lens $E^2$ and the other components serving to accommodate the inclined mirror $E^1$.

The removable framework G carrying the four slits F consists of a flat plate bored with four appropriately spaced holes, each accommodating a cell containing the slit. Each cell, as shown in Figures 4–6, consists of a flanged cylindrical portion $F^1$ fitting into the hole in the plate G and held in position therein by a nut $F^2$ screwed on to the cylinder on the end thereof remote from the flange, the cell having on one side a projecting pin $F^3$ engaging in a slot $G^2$ cut in the plate G in order to ensure correct orientation of the cell $F^1$ in the hole. Two discs $F^4$, each cut with a central slot $F^5$, are fitted into the ends of the cylinder $F^1$ (one of the discs being shown as integral with the cylinder $F^1$ in the example illustrated), and the slit itself is formed between knife edges on two members $F^6$ housed within the cell $F^1$ between the two discs $F^4$. These two members $F^6$ are shaped (at least in the neighbourhood of the knife edges) to correspond to the shape of the particular portions of the blade A on either side of the section plane and are held accurately in position in the cell by means of adjusting screws $F^7$ in the two discs $F^4$, further adjusting screws $F^8$ being provided in the cylinder $F^1$ to enable the width of the slit between the knife edges to be accurately adjusted. The two knife edge members $F^6$ in the upper cell corresponding to one section profile are identical with those in the lower cell corresponding to the same section profile, except that in one cell the knife edges are formed by chamfering to the front surfaces of the members $F^6$ whilst in the other cell the knife edges are formed by chamfering to the back surfaces of the members. The slit between the knife edges in each cell is of course aligned with the slots $F^5$ in the discs $F^4$ and accurately oriented in the cell in relation to the projecting pin $F^3$, so that it will be exactly in the right position when the cell is mounted in the framework plate G and the framework plate is placed in position on the base D of the apparatus. It is important to keep the slit as narrow as is practicable in order that the section profile shall be very sharply defined.

It will be appreciated that the slit may be formed and mounted in the cell in other ways, and it is not even essential to employ a slit. Thus a suitable alternative may be provided, as shown in Figures 7 and 8, either by engraving a fine line $F^9$ on the surface of a body $F^{10}$ of glass or transparent plastic material shaped to correspond to the shape of the corresponding portion of the side of the blade to be illuminated, or by ruling a fine line through an opaque coating on such a body.

It will be clear that a separate slit framework G is required for each size and shape of turbine blade A to be tested, the slits F being suited in each case to the desired section profiles and the spacings between the holes in the framework plate G likewise being different for different sizes of blade.

In the example shown in Figures 1–3, each slit F is illuminated by a separate illuminating device mounted on the base D of the apparatus, this device comprising a source of light H, consisting for example of a mercury vapour lamp, associated with a condensing lens $H^1$, and a lens $H^2$ for focussing the source H on to the slit F.

It has been mentioned that different spacings between the slits F in the framework G are required for different sizes of blade A, and it will be clear therefore that there must be corresponding adjustability in the other parts of the means for defining the section profiles on the blades. The positions of the slits F and of the associated lens systems E, $E^2$, $E^3$ and illuminating devices H, $H^1$, $H^2$, corresponding to the section profile $A^2$ nearest the root of the blade A are fixed, since such section profile $A^2$ lies in the object plane of the projecting system C. In the arrangement shown in Figures 1–3, the other section profile $A^1$, whose position has to be adjusted to suit the size of the blade A being tested, is defined by means of a stationary lens system E, $E^2$, $E^3$ corrected for a sufficiently wide angular field to cover the whole of the desired range of positions of this section profile, the position of the section profile varying with the spacing between the slits F in the framework G, as imaged on the blade surface by this stationary lens system. The illuminating devices H, $H^1$, $H^2$ for the two slits F associated with this section profile $A^1$ are, however, adjustable on slides $H^4$ on the fixed base D, so that they can be moved to suit the framework slit spacing, the position of adjustment in each case conveniently being determined by means of a special distance piece $H^5$ for each framework G. Thus, in this example, the only changes needed in the means for defining the section profiles on the blade surface, for different blade sizes, are the substitution of the appropriate slit framework G and the corresponding movement of the illuminating devices on the slides $H^4$.

In the foregoing arrangement, a separating illuminating device has been used for each slit F, but since the upper and lower illuminating devices for any one section profile will always move through exactly the same distance during adjustment, it is possible, if desired, to combine them together and to use a single source of light H for the two devices, as shown in Figure 9, two inclined mirrors $H^6$ being provided respectively above and below this source to deflect its rays through the two sets of lenses $H^1$, $H^2$.

Instead of using stationary lens systems having a wide enough field to cover the range of adjustment, the different spacings between the section profiles can be dealt with by lateral adjustment of the lens systems. Figures 10–12 illustrate such an arrangement, which is shown by way of example as providing for three section profiles instead of two, one $A^2$ fixed near the root of the blade A in the object plane of the projecting system C and the other two $A^1$ and $A^4$ adjustable so as to be located respectively near the blade tip and at an intermediate point in the length of the blade. Figure 12 illustrates the adjustability of the parts, whilst Figures 10 and 11 show the optical system used.

In this arrangement, the interchangeable framework G has six slits F, which may each be of the kind described with reference to Figures 4–6 or Figures 7 and 8, arranged in two horizontal rows of three, the three slits in the upper row corresponding to the upper halves of the section profiles, whilst those in the lower row correspond to the lower halves thereof. The six copying lens systems E, $E^2$, $E^3$ have their optical axes parallel to one another and spaced apart at the same distances as the slits F in the framework G, but since for the smaller sizes of blade there is insufficient room for the lenses E to lie side by side with their axes spaced apart by the same spacings as the section profiles, the two outer lens systems in each row are each provided with a trapezoidal reflecting prism $E^4$ between the lens E and the inclined mirror $E^1$, for deflecting the optical axis and bringing it nearer to that of the middle system. The dimensions of the middle system are made a little different from those of the two outer systems, so as to allow for the difference in ray path produced by the reflecting prisms $E^4$ and thereby to permit all the slits F to lie in the same plane. Since the beam of light passing through each of the front field lenses $E^2$ is relatively long and narrow, it is possible to cut off the unused side segmental portions of these lenses and thereby to permit them to be located close together to suit the relatively narrow spacings between the section planes. The spacings of the slits F in the interchangeable frameworks G are of course chosen to allow for the displacement of the optical axes by the trapezoidal prisms $E^4$. Each slit F is illuminated by an illuminating device H, $H^1$, $H^2$ similar to that above described.

The necessary adjustments for dealing with different sizes of blade are effected in the manner shown in Figure 12. The copying lens system E, $E^2$, $E^3$, $E^4$ and the illuminating device H, $H^1$, $H^2$ associated with the section profile $A^2$ nearest the root of the blade A are fixed in position, whilst the other copying lens systems are mounted on slideways $E^5$ and the corresponding illuminating devices are likewise mounted on slideways $H^4$. Whilst a single slideway could be used for the two lens systems and the two illuminating devices associated with one section profile, it will usually be more satisfactory to use separate slideways as shown and to rely on accurately dimensioned distance pieces $E^6$ and $H^5$ to ensure the proper adjustment of the parts.

Figures 13 and 14 show another alternative arrangement, providing for two section profiles, wherein the lens systems E, $E^3$ and the illuminating devices H, $H^1$, $H^2$, including the lamps, are all stationary, and the spacing between the holes for the slit cells $F^1$ in the framework G is the same for all frameworks, whatever the size of the blade A being tested. It is still, however, necessary to provide separate slit frameworks G for each different shape of turbine blade, owing to the different shapes of the slits needed, or alternatively to provide interchangeable slit cells in a fixed framework.

In this arrangement, the necessary adjustment to suit different spacings between the section profiles is obtained wholly by movement of reflectors interposed between the main components E of the lens systems and the inclined mirrors $E^1$. For this purpose, each reflector consists of a right-angled prism J or $J^1$ disposed on the side of the inclined mirror $E^1$ remote from the main components E of the lens system, the optical axis of the lens system being reflected twice internally at the surfaces of the prism J or $J^1$ so that it returns to the inclined mirror $E^1$ in a direction parallel to its original direction.

The two prisms J associated with the section profile $A^2$ near the root A³ of the blade A are fixed in position, but the other two prisms J¹ are movable towards and away from such fixed prisms J. With such an arrangement, it will be clear that a movement of the pair of prisms J¹ from one position to another will result in a movement of the section profile A¹ through twice the distance, and it is necessary therefore to provide for movement of the associated field lenses E² at twice the rate of movement of the prisms J¹. Since the axial length of the ray path remains unaltered during the prism movements the image will remain properly focussed on the blade in all positions of the prism. It should be mentioned that the inclined mirrors E¹ in this arrangement are made short enough not to interfere with the light beams from the main components E of the lens systems and are inclined at 45° in the direction opposite to that required in the previous arrangements. Whilst the movable prisms J¹ and their associated field lenses E² may be coupled together by adjusting mechanism giving the appropriate ratio between the movements, it will usually be simpler to mount them on separate slideways J² and E⁷, as shown, using appropriately dimensioned distance pieces J³ and E⁸ to determine their positions.

In all the foregoing arrangements, a single interchangeable framework G has been used to carry all the slits F, for both sides of the blade for all the section profiles. This is not, however, essential, and, if preferred, two frameworks G may be employed, one carrying the slits F for the halves of all the section profiles on one face of the blade A, and the other carrying the slits F for the halves of all the section profiles on the opposite face of the blade. One simple arrangement of this kind is illustrated in Figure 15 (wherein the same reference letters are used as in the other figures), the means for defining the section profiles being divided into two halves respectively on opposite sides of the blade, with the optical axes of the corresponding copying lens systems and illuminating devices directly in line with one another. It will be clear that the various alternative arrangements for effecting adjustment to suit different sizes of blade are equally applicable to this alternative.

It will be appreciated that the foregoing arrangements have been described by way of example only, and that the invention may be carried into practice in various ways. Thus, it is not essential to the invention to employ a separate copying lens system for each slit or a separate illuminating lamp for each slit or pair of slits. Again, although described more particularly for the examination of turbine blades, the invention may be employed for examining other bodies.

What we claim as our invention and desire to secure by Letters Patent is:

1. Optical apparatus for comparing, measuring or testing the accuracy of plane section profiles in groups of not less than two, including in combination with a base, means for mounting on the base a body whose section profiles are to be examined, means for simultaneously defining a plurality of parallel plane sections on the surface of the body, and optical means for projecting images of such section profiles, said defining means comprising at least two sets of complementary masks, each set being associated with and shaped to suit the individual half section profiles of a particular plane section, a removable framework common to the sets of complementary masks and provided with means for fixedly mounting all said masks thereon, means for detachably mounting said framework on the base, means on the base for illuminating the masks, and means including reflectors on the base for focussing images of the masks on the opposite surfaces of the body to define at least two complete section profiles thereon.

2. Optical apparatus as set forth in claim 1 wherein the spacing of the sets of complementary masks on the framework is determined in accordance with the desired spacing of the planes of the particular section profiles to be examined.

3. Optical apparatus as set forth in claim 2 wherein the means for illuminating the mask comprises a plurality of illuminator units respectively associated with the individual section profiles, and means for adjusting the relative positions of such illuminator units to suit the spacing of the sets of complementary masks on the framework.

4. Optical apparatus as set forth in claim 1 wherein the mask image focussing means includes a plurality of stationary lens systems each of which is associated with one of the masks of a set of complementary masks.

5. Optical apparatus as set forth in claim 1 comprising reflecting means interposed between the body under test and the sets of complementary mask image focussing means, and means for adjusting at least part of such reflecting means whereby the spacing of the planes of the section profiles can be altered independently of the illuminating means and the mask image focussing means, the spacing of the masks on the framework being independent of the spacing of the planes of the section profiles.

6. Optical apparatus as set forth in claim 5 wherein the said reflecting means includes at least one adjustable pair of relatively fixed right-angled prisms so mounted that the rays are reflected twice on the right-angled surfaces thereof and emerge parallel to their direction of incidence but in the opposite sense.

References Cited in the file of this patent

UNITED STATES PATENTS

| | | |
|---|---|---|
| 1,756,785 | Gallasch | Apr. 29, 1930 |
| 1,953,299 | Grant | Apr. 3, 1934 |
| 2,256,102 | Reason | Sept. 16, 1941 |
| 2,410,550 | Padva | Nov. 5, 1946 |
| 2,478,780 | Pettus | Aug. 9, 1949 |
| 2,574,119 | Mottu | Nov. 6, 1951 |
| 2,607,267 | Fultz | Aug. 19, 1952 |